United States Patent
Blanchard et al.

(10) Patent No.: US 6,870,544 B2
(45) Date of Patent: Mar. 22, 2005

(54) HARMONIZING COLOR SELECTION SYSTEM AND METHOD

(75) Inventors: Clark E. Blanchard, Grand Rapids, MI (US); Richard D. Haadsma, Grand Rapids, MI (US)

(73) Assignee: X-Rite, Incorporated, Grandville, MI (US)

( * ) Notice: Subject to any disclaimer, the term of this patent is extended or adjusted under 35 U.S.C. 154(b) by 49 days.

(21) Appl. No.: 10/042,840

(22) Filed: Jan. 9, 2002

(65) Prior Publication Data

US 2002/0089513 A1 Jul. 11, 2002

Related U.S. Application Data

(60) Provisional application No. 60/260,823, filed on Jan. 10, 2001.

(51) Int. Cl.$^7$ ................................................. G09G 5/02
(52) U.S. Cl. ....................... 345/589; 345/593; 345/604; 345/605; 345/600
(58) Field of Search .................... 345/589, 593, 345/604, 605, 600

(56) References Cited

U.S. PATENT DOCUMENTS

| | | | |
|---|---|---|---|
| 4,403,866 A | * 9/1983 | Falcoff et al. ............... 366/132 |
| 4,721,951 A | 1/1988 | Holler | |
| 4,843,573 A | * 6/1989 | Taylor et al. ................ 345/591 |
| 4,977,522 A | 12/1990 | David | |
| 5,051,928 A | * 9/1991 | Gruters ........................ 345/591 |
| 5,177,694 A | 1/1993 | Graham et al. | |
| 5,311,212 A | * 5/1994 | Beretta ........................ 345/591 |
| 5,473,738 A | 12/1995 | Hamlin et al. | |
| 5,508,718 A | * 4/1996 | Haikin ......................... 345/601 |
| 5,986,670 A | * 11/1999 | Dries et al. .................. 345/629 |
| 6,031,543 A | * 2/2000 | Miyashita et al. ............ 345/593 |
| 6,053,218 A | * 4/2000 | Boers ........................... 141/83 |
| 6,081,253 A | 6/2000 | Luke et al. | |
| 6,137,499 A | * 10/2000 | Tesler .......................... 345/440 |
| 6,313,840 B1 | * 11/2001 | Bilodeau et al. ............. 345/423 |
| 6,549,213 B1 | * 4/2003 | Sadka .......................... 345/593 |
| 6,563,510 B1 | * 5/2003 | Rice et al. .................... 345/593 |

FOREIGN PATENT DOCUMENTS

GB 2286511 8/1995

OTHER PUBLICATIONS

"A Guide to Understanding Color Tolerancing", X–Rite, Incorporated, 1994.
Y. Sato, "A Color Scheme Supporting Method in a Color Design System", SPIE vol. 2411, pp. 25–34.

* cited by examiner

*Primary Examiner*—Matthew C. Bella
*Assistant Examiner*—Po-Wei Chen
(74) *Attorney, Agent, or Firm*—Warner Norcross & Judd

(57) ABSTRACT

A system and method for calculating harmonizing colors based on a reference color. In a first embodiment, the invention includes (a) defining a reference color in a uniform color space, (b) converting the hue of the reference color from the uniform color space to an artists color wheel, (c) determining harmonizing colors for the reference color within the artists color wheel, (d) converting the hues of the harmonizing colors from the artists color wheel to the uniform color space, and (e) displaying the harmonizing color information. In a second embodiment, a brown region is defined for colors having red/orange/yellow hues and low chroma values. Additional harmonizing colors are determined when either the reference color or one of the harmonizing colors falls within the brown region.

17 Claims, 9 Drawing Sheets

(2 of 9 Drawing Sheet(s) Filed in Color)

Artists' Color Wheel vs. CIE Hue Angle

HARMONIZING COLOR SELECTION SYSTEM AND METHOD

This nonprovisional application claims priority from provisional patent application No. 60/260,823, filed Jan. 10, 2001, entitled "Method of Harmonizing Colors", the disclosure of which is incorporated by reference.

BACKGROUND OF INVENTION

This invention relates to systems and methods for selecting harmonizing colors, and more particularly to such systems and methods that are computer automated.

There are many existing and potential commercial applications in which it would be desirable to determine harmonizing colors quickly and accurately given a reference color. One example of such a commercial application is in the architectural decorating field. Typically, a specialist, trained or gifted in the aesthetics of color harmonization, is employed to assist in determining harmonious decorating colors. It would be advantageous to have a system available for a consumer to find harmonizing colors without the aid of a professional, thus saving both time and money.

The rules for color harmonization have been well known in the art world for centuries, and were formalized by Johannes Itten and included in his book, "The Art of Color", published in Germany in 1961. Since then, these principles have been widely published, primarily in the art world. Two current examples are "Color Harmony", by Hideaki Chijiiwa, first published in America in 1987; and "Color Harmony 2", by Bride M. Whelan, first published in America in 1994.

Computer automated systems for calculating colors that harmonize with a reference color are well known. In such systems, the colors are represented in a uniform color space; and mathematical calculations are performed to select harmonizing colors based on the reference color. Examples of such systems are illustrated in U.S. Pat. No. 5,311,212, issued May 10, 1994, entitled "Functional Color Selection System"; U.S. Pat. No. 6,081,253, issued Jun. 27, 2000, entitled "Method for Generating Numerous Harmonious Color Palettes from Two Colors". Generally, the reference color is either measured or selected from a color fandeck. All colors are specified and calculated within a uniform color space, in which colors are defined in terms of lightness, chroma and hue.

Unfortunately, the prior art attempts to mathematically calculate harmonizing colors do not consistently suggest colors that truly harmonize with the reference color. In fact, the suggested colors are often quite unpleasant and indeed do not harmonize. This situation is clearly unacceptable to those skilled in color harmonization, and also to consumers.

The erroneous suggestion of harmonizing colors is particularly severe in the case of "browns". This has increasingly become a problem as the decorating industry makes greater use of the earth tones, which include many different shades of brown. The difficulty with browns arises from human color perception. Humans see browns as a separate and distinct hue. In fact, browns are shades of other hues, such as red, yellow, and orange. Consequently, the calculation of brown harmonizing colors in a uniform color often results in suggestions that are unpleasing to the human eye.

SUMMARY OF INVENTION

We have discovered that the fundamental difficulty in calculating harmonizing colors in a uniform color space is that the hue acuity of the human eye is non-uniform. For that reason, harmonizing colors calculated in a uniform color space often are actually not at all harmonizing to the human eye. As part of the present invention, we have conceived that accurate color harmonization must be determined in a color space more closely approximating the hue acuity of the human eye. One such a color space is the artists color wheel.

Figure 1:
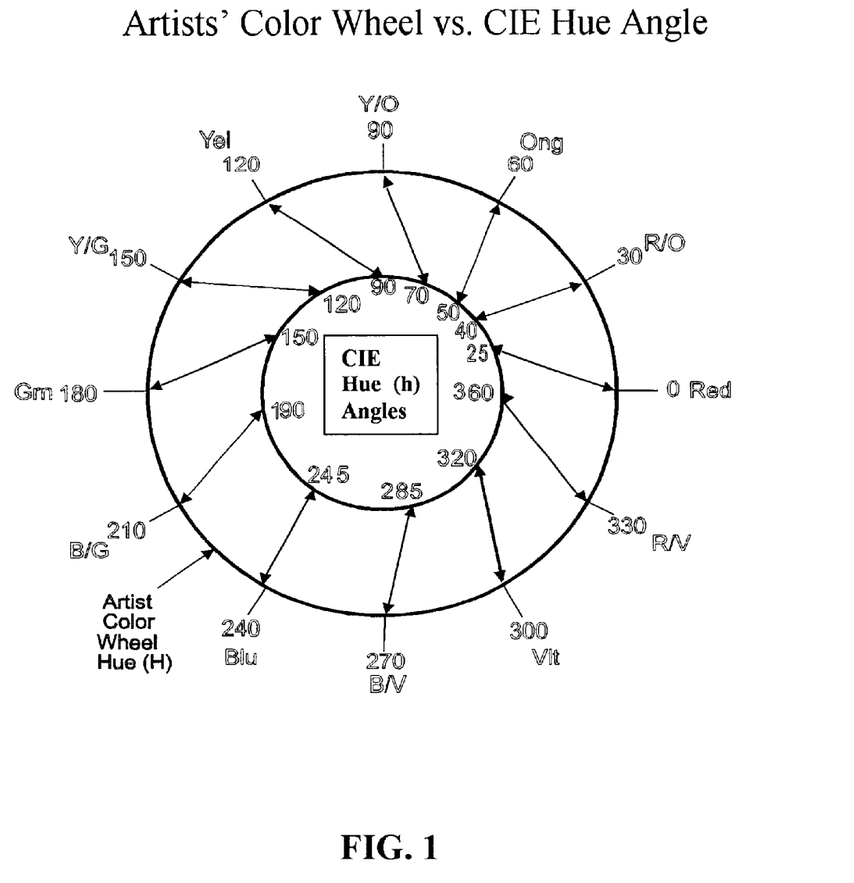
FIG. 1 illustrates the empirically derived correspondence that we have defined between the hue angles of the artists color wheel and the hue angles of the CIE color wheel.

The non-uniformity of human hue acuity skews the hue angles in a uniform color space as shown in FIG. 1. The artists color wheel, which is based on human color perception, has different hue angle intervals between hues than does a uniform color space. For example, human acuity of hue angle is greater in the yellows and oranges than it is in the greens. As a result, the hue angles for colors on the artists color wheel differ from the hue angles for the same colors on the CIE color wheel. In the artists color wheel, the hue opposite, or the direct complement, of yellow is violet. In the CIE hue wheel, the hue opposite of yellow is blue.

Applying this discovery, the aforementioned problems of the prior art approaches are overcome in the present invention wherein one or more harmonizing colors are selected by (1) converting the reference color from a first color space to a second color space having improved correspondence to human hue acuity, (2) selecting one or more harmonizing colors in the second color space, and (3) converting the harmonizing colors from the second color space to the first color space.

In the disclosed embodiment, the first color space is the CIE Lab or CIE Lch color space; and the second color space is the artists color wheel. Polynomial equations and/or look-up tables are used to make the conversions between the two spaces.

Further in the disclosed embodiment, the system and method offer multiple color harmonization suggestions based on different color harmonization schemes, and the suggestions are displayed to a consumer. The consumer may then select one or more of the suggestions.

In a second aspect of the invention, special rules are adopted for selecting harmonizing colors that involved browns. As noted above, browns are actually yellows, oranges and some reds. When the chroma value of these hues drops below approximately 40, a color which humans perceive as brown results. The direct complement of a blue with a chroma below 40 is a brown. However, the direct complement of a blue with a chroma above 40 is an orange. In fact, the brown and orange at the same hue are both acceptable harmony colors for the blue. Conversely, we have discovered that, if one wants the complement of the orange with a chroma above 40, the brown at the same hue is an acceptable harmony color. None of the prior art systems or methods would suggest it.

Applying this second discovery, and in a second embodiment of the invention, the color harmonization system and method treat browns in a special manner. If either the reference color or the harmony color is a brown, the system will determine a non-brown at the same hue angle and suggest this non-brown as an additional harmonizing color. If the reference color or the harmony color is a non-brown for which there is a corresponding brown at the same hue angle, the system will suggest the brown as an additional harmonizing color.

The present system and method have several advantages. First, the harmonizing color schemes derived by the new method match the color schemes in the art and decorating world. This eliminates the color mismatches that occur with prior systems that determined color schemes in relation to uniform color spaces. Second, the new method treats browns in a special way to maximize the number of harmonizing colors available.

These and other objects, advantages, and features of the invention will be more readily understood and appreciated by reference to the detailed description of the preferred embodiment and the drawings.

BRIEF DESCRIPTION OF THE DRAWINGS

The patent or application file contains at least one drawing executed in color copies of this patent or patent application publication with color drawing(s) will be provided by the office upon request and payment of the necessary fee.

DETAILED DESCRIPTION OF THE PREFERRED EMBODIMENT

While the invention will be described with reference to preferred embodiments, it is to be understood that there is no intent to limit the invention to those embodiments. On the contrary, the aim is to cover all modifications, alternatives and equivalents falling within the spirit and scope of the invention as defined by the appended claims.

A. Theories of Color Harmonization

For many reasons it can be desirable in decorating to use multiple colors in a single environment. For example, three colors might be chosen for interior decorating—a body color, a trim color and an accent color. When choosing colors, people generally choose a body color first and then utilize color harmonization schemes to choose harmonious trim and accent colors.

Several works have defined the basic color harmonization schemes. The most common are "Principles of Color Design" by Wucius Wong (1997) and the above noted "Color Harmony" and "Color Harmony". These works disclose the following ten basic color harmonization schemes:

1. Achromatic Scheme—Without color, uses only black, white and shades of gray.

2. Analogous Scheme—Uses any three consecutive hues (30 degrees apart) or any of their tints and shades. Harmonizing colors are the reference color (R)+30 degrees and R−30 degrees.

3. Clash Scheme—Combines a color with the hue that is 30 degrees to the right or left of its complement on the color wheel. Harmonizing colors are R+/−150 degrees.

4. Complementary Scheme—Uses direct opposites on the color wheel. Harmonizing color is R+180 degrees.

5. Monochromatic Scheme—Uses one hue in combination with any or all of its tints and shades.

6. Neutral Scheme—Uses a hue that has been diminished or neutralized by the addition of its complement or black. Harmonizing color is R combined with R+180 degrees.

7. Split Complementary Scheme—Consists of a hue and the two hues on either 30-degree side of its complement. Harmonizing colors are R+150 degrees and R−150 degrees.

8. Primary Scheme—A combination of the pure hues of red, yellow and blue.

9. Secondary Scheme—A combination of the secondary hues of green, violet and orange.

10. Tertiary Triad Scheme—A tertiary triad is one of two combinations: (a) red/orange, yellow/green and blue/violet or (b) blue/green, yellow/orange and red/violet.

Figure 4:
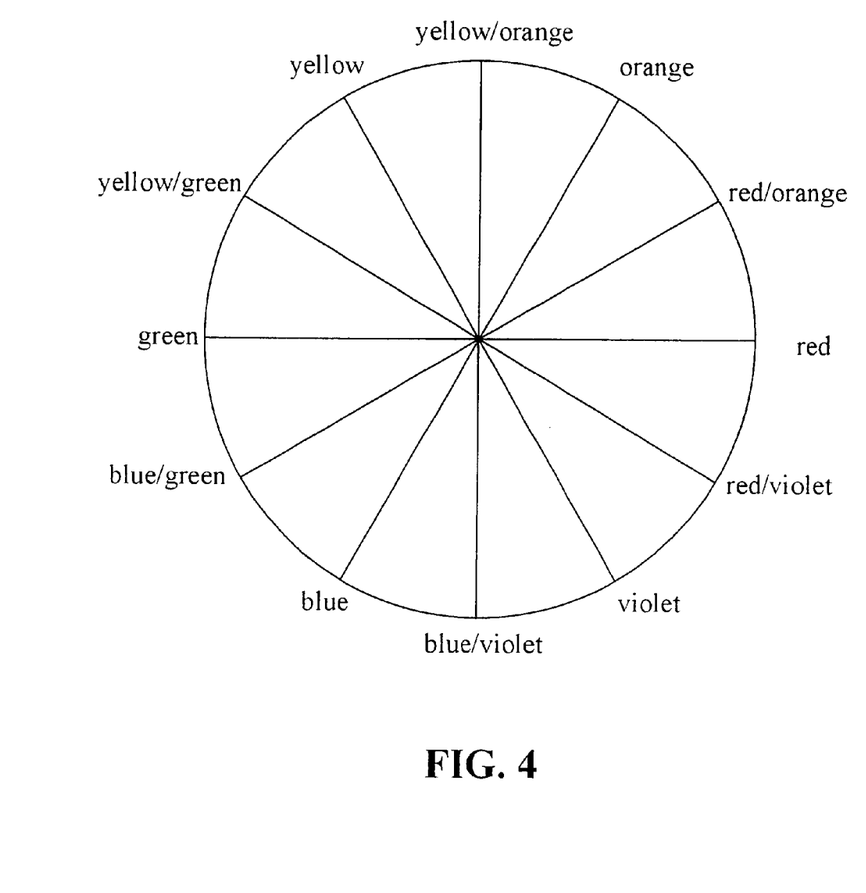
FIG. 4 is a 12-color artists color wheel.

These color harmonization schemes are used in conjunction with any artists color wheel. In the disclosed embodiment, the invention is described in conjunction with the twelve-color artists color wheel, which is shown in FIG. 4. Most of the color harmonization schemes can be defined in terms of angles added to or subtracted from a reference color on the artists color wheel. The last three color schemes (Primary, Secondary and Tertiary Triad) are defined by the same angle formulas, but have specific starting reference colors required. Because the present system and method permit the use of any color as the reference color, these last three color harmonization schemes are combined and referred to as the Triad Scheme. This reduces the total number of color schemes to eight.

The Monochromatic Scheme simply varies the lightness and chroma of any hue on the color wheel. The Achromatic Scheme technically has no hue and varies lightness and chroma between shades of gray. Accordingly, neither scheme can be defined in terms of a hue angle formula.

B. Hue Angle Correspondence Between the CIE Color Space and the Artists Color Wheel In general, color systems define colors in terms of a uniform color space defined by a color tolerancing system. These color spaces and tolerancing systems are easy to apply to technical applications. The most common color spaces are CIE L*a*b* and CIE L*c*h*. The two systems are very similar with the L*a*b* space using rectangular coordinates and the L*c*h* space using cylindrical coordinates. Hue is defined in a plane in both systems. For purposes of this disclosure, reference will only be made to the CIE L*c*h* system.

The CIE L*c*h* (Lch) system defines colors in terms of lightness (L), chroma (c) and hue (h). Hue is defined in a plane with red, yellow, green and blue being 90 degrees apart from one another. A color's hue is an angle in that plane. The Lch space is uniform, which is suitable and indeed desirable for many calculations.

Another way to define hue is in the artists color wheel, which is based on human color perception. The artists color wheel is universally recognized in the field of art and is illustrated in FIG. 4. The wheel includes the colors red, yellow and blue spaced equally about the wheel, each being 120 degrees from the other two. For purposes of this disclosure, red is arbitrarily selected as 0 degrees on the wheel. As can be seen in FIG. 1, the hue angles on the Artists color wheel are generally different from the hue angles on the Lch color wheel. The hue angles are the same only for a first color between 30 and 60 degrees and a second color between 210 and 240 degrees both with respect to the artists color wheel.

The artists color wheel is non-uniform, but provides a better correspondence to the hue acuity of the human eye. The artists color wheel can be considered a color space with only the two dimensions of hue and chroma. The artists color wheel does not include the third dimension of lightness that is found in a three-dimensional color space such as the Lch space. Color spaces other than the artists color wheel could be used so long as they provide a better correspondence to the hue acuity of the human eye than does the first uniform color space.

Application of the same harmonizing color schemes in the two spaces to the same reference color generally results in different suggested harmonizing colors. For example, the direct complement of a color is the color that is 180 degrees from the reference color. In the Lch color space, the direct complement of yellow is blue. On the Artists color wheel, however, the direct complement of yellow is violet.

FIG. 1 shows the differences in hue angles between the CIE color wheel and the Artists color wheel as we have empirically determined those differences by measuring the actual colors on the artists color wheel. The exterior circle shows the hue angle of colors on the Artists color wheel. The interior circle shows the corresponding hue angles of same colors on the CIE color wheel. As can be seen from the graph, the hue angles on the two wheels are different. Though red on the artists color wheel is located at 0°, the same color on the CIE wheel is located at 25°.

Since color harmonization schemes were determined by the art and decorating world, and thus with reference to the Artists color wheel, they often result in strange combinations when applied in a CIE color space. For example, in a tertiary color harmonization scheme the complementary colors are located 120 degrees from the reference color. In Lch color space, this would result in yellow/green being a complement for red.

We have recognized that color harmonization schemes can be applied only with respect to the artists color wheel. Therefore, to appropriately apply color harmonization schemes to a color defined in a uniform color space, it is necessary to first convert the hue angles to the corresponding hue angles on the artists color wheel. After the harmonizing colors are determined on the artists color wheel, then the harmonizing colors are converted back to the corresponding hue angles in the uniform color space.

Figure 2:
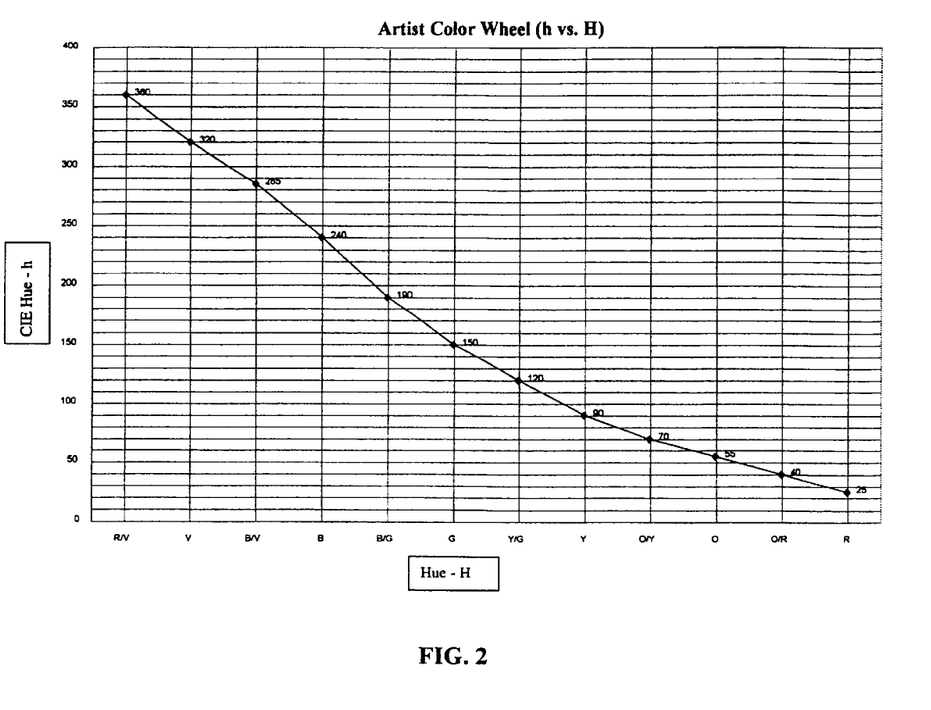
FIG. 2 is a graph of the correspondence illustrated in FIG. 1 with the artists color wheel hue angle on the horizontal axis and the CIE hue angle on the vertical axis.

The hue angle conversion is accomplished by deriving a formula that defines the relationship between Lch hue angles (h) and Artists hue angles (H). Such a formula can be found by plotting a graph of h vs. H, as shown in FIG. 2. 'H' is plotted on the x-axis, and is the hue angle for a given color on the Artists color wheel. 'h' is plotted on the y-axis, and is the hue angle for the same color on the Lch color wheel. Therefore, a point on the graph represents the intersection of the two hue angles in the two color spaces for the same color.

Two methods can be used to convert between h and H. First, a look-up table can be obtained from the graph. This look up table can show the relative h and H values for all of the desired points on the graph. An alternate method is to derive the equation that defines the curve of the graph in FIG. 2. This can be done by typical mathematical processes known in the art. This method is preferable since it provides unlimited possibilities for reference colors. The following equations for converting h to H and for converting H to h were derived from the empirically derived data illustrated in the graphs:

(1) $H = a + bh + ch^2 + dh^3 + eh^4$ where: $a = -72.6444216687$
$b = 2.2399848371$
$c = -0.0155877692$
$d = 0.0000398916$
$e = -0.000000036$ (2) $h = f + gH + jH^2 + kH^3 + mH^4$ where: $f = 25.2724358974$
$g = 0.5075528252$
$j = -0.0026710077$
$k = 0.0000311684$
$m = -0.000000056$ C. Special Treatment of Browns Browns are not separate hues, but rather are low-chroma colors in the hues of red, yellow, and orange. Because browns are not their own hue, and further because shades of brown do not exist at every hue, browns are treated specially in the present system and method.

Figure 3:
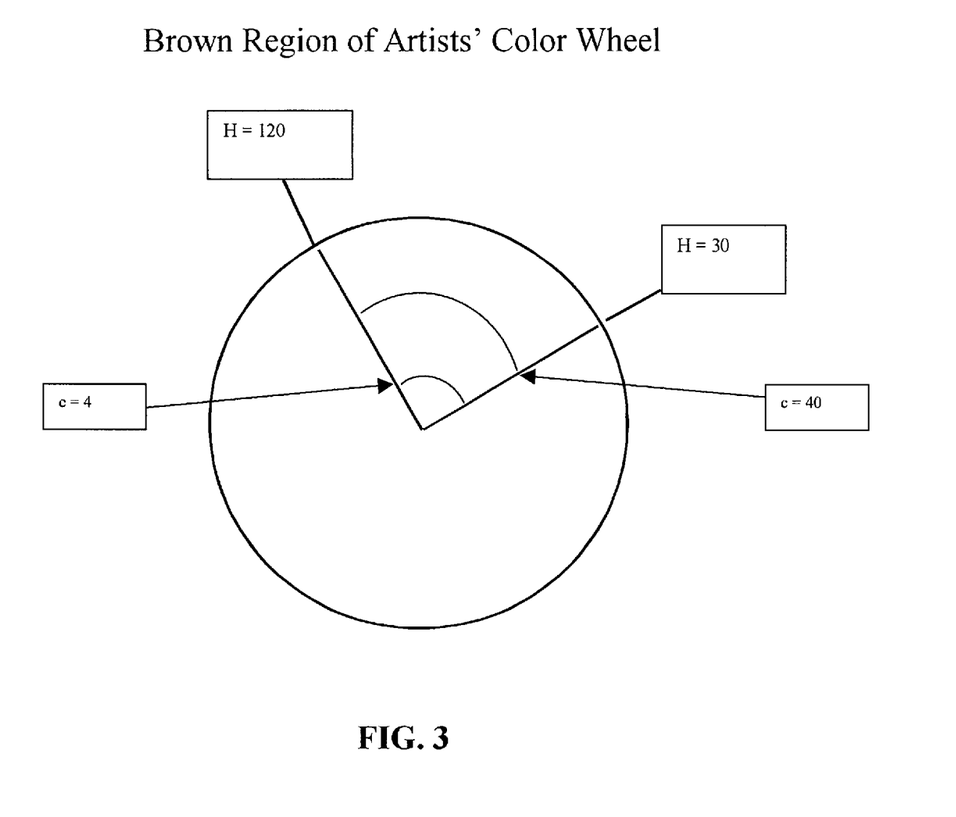
FIG. 3 illustrates the brown region that we have defined on the artists color wheel.

The brown region on the artists color wheel is defined for the present invention by examining low-chroma colors in the red/yellow region and identifying those that could subjectively be termed 'brown'. Based on these color samples, a region on the color wheel into which the majority of the samples fall is identified. An example of a brown region, defined by this method, is shown in FIG. 3. This brown region includes hue angles (H) between 30 and 120 and chroma values (c) between 4 and 40. Therefore, the hue angles of 30 and 120 are considered the brown hue angle boundaries; and the chroma values of 4 and 40 are considered the brown chroma value boundaries. Defining the brown region is subjective, so other hue and/or chroma values could be selected as the definition of the brown region.

We have identified four situations in which browns should receive special treatment in color harmonization schemes. All four situations have in common that either the reference color or one of the harmonization colors falls within the brown region. Without special treatment, all of these situations would identify less than all of the available harmonizing colors. The situations will be discussed with reference to finding the direct complement of a reference color, though the methods used can be applied to any color harmonization scheme.

The first situation is where brown is the reference color. In attempting to find the direct complement of a typical brown, for example with an H value of 70 and c value of 20, only one color would be calculated without special treatment. This would be the blue/green with an H' value of 250 and a c value of 20. There is another possibility for a harmonizing color, however, which would not be suggested. This is the orange/yellow with an H' value of 70 and c value greater than 40. Therefore, the system additionally identifies as a harmonizing color the color (a) whose hue is the same as the brown and (b) whose chroma value is 55. The chroma can be any value in the non-brown region, and we have arbitrarily selected 55. Any other non-brown chroma value could be used. This additional harmonizing color is called a secondary complement.

The second situation is where brown is the harmonizing color. If the reference color is a blue/green, for example having an H value of 225, with a c value between 4 and 40, the direct complement would be a brown, with H' value of 45 and the same c value. A non-brown with an H' value of 45 would be a secondary complement, but would not be suggested without special treatment. Accordingly, the system identifies this additional complement with an H' value of 45 and a c value of 55. As before, the c value is arbitrarily selected and could be other c values in the non-brown region.

The third situation is where the complement of the reference color is a non-brown with H' value between 30 and 120. For example, if the reference color were a blue with an H value of 240 and c value of 60, the complement would be an orange with H' value of 60 and c value of 60. A secondary complement that would not be suggested without special treatment is the same hue, but in the brown region. This secondary complement is identified by the system with an H' value of 60 and a c value of 25. Again, the c value is arbitrarily selected to be within the brown region, and other c values could be selected as desired.

The fourth situation is where the reference color is a non-brown with a hue in the brown region. For example, if the reference color is an orange with an H value of 60 and a c value of 60, the complement is a blue with an H' value of 240 and a c value of 60. A secondary complement is in the brown region at the same hue angle. Accordingly, the system identifies as a secondary complement the color with an H' value of 60 and c value of 25. Once again, the c value is selected to be in the brown region, and other c values could be used.

In all of the foregoing brown examples, we again point out that the hue values and the chroma values are suggested based on empirically derived data and subjective decisions. Other values may be appropriate in defining the brown region and/or in suggesting appropriate harmonizing colors inside and outside the brown region.

D. The Color Harmonization System and Method

The color harmonization system and method first require a user to select a reference color. This typically is done in one of two ways. First, the color can be measured from a sample of wallpaper, fabric, or virtually any other material to be matched. Second, the color can be selected using an input means from a stored color library, often referred to as a color fandeck, a color swatchbook, or a color palette. Sometimes the two techniques are combined so that the system measures a color and suggests colors from the color library that most closely match the measured color. In that case, the customer selects one of the recommended colors as the reference color. In all of the color selection techniques, the color is defined in a uniform color space such as the Lch color space, because all color measurement and matching systems utilize these defined and approved color spaces.

Figure 8:
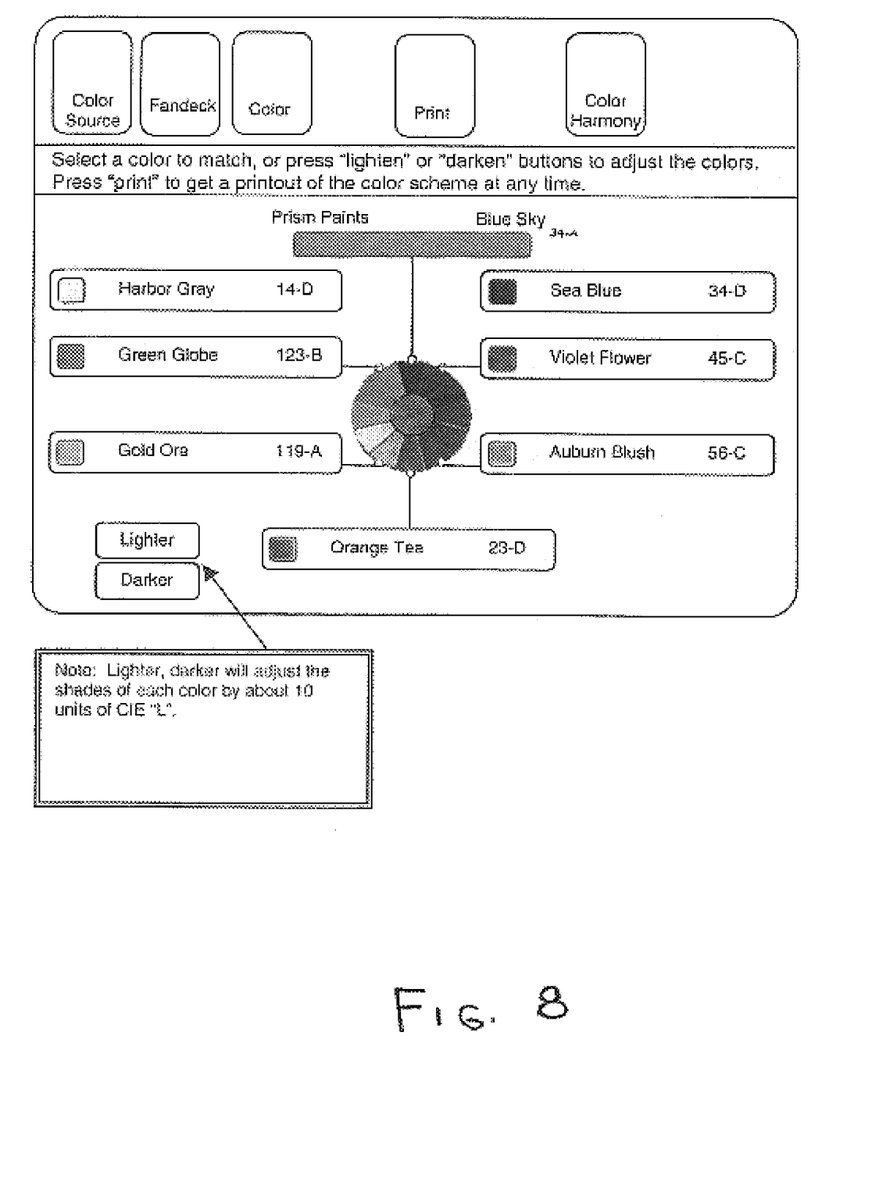
FIG. 8 is the graphic user interface showing the display of a reference color and harmonizing colors.
Figure 9:
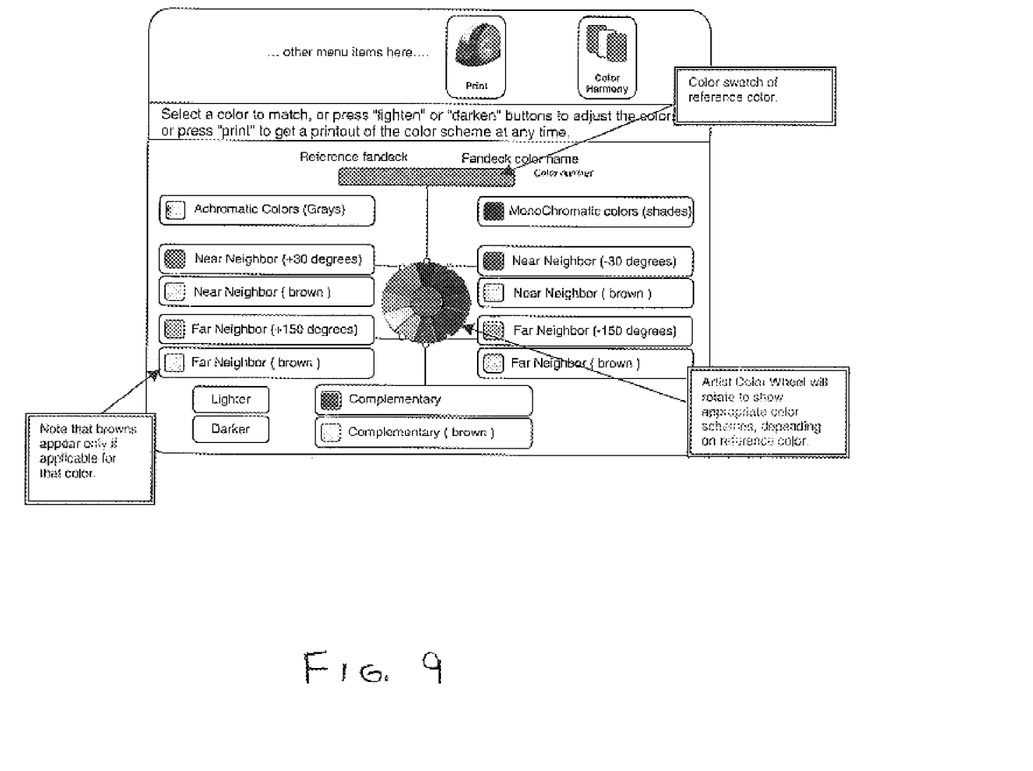
FIG. 9 is the graphic user interface showing the display of a reference color and harmonizing colors where one of the colors is a brown.

The Lch hue of the reference color is then converted to the artists color wheel hue using the conversion formulas discussed above, or another suitable technique such as look-up tables. The system than calculates all of the harmonizing colors for all of the above noted techniques, and also calculates the additional harmonizing colors for browns if appropriate. All of the harmonizing color hues are then converted to the Lch hues for display on a monitor or other output device. All of the harmonizing colors are displayed to the user as illustrated in FIG. 8 if no browns are applicable and as illustrated in FIG. 9 where browns are applicable.

As an option, the user is permitted (a) to select one or more harmonizing schemes to be calculated and/or displayed to the user or (b) to deselect one or more harmonizing schemes not to be calculated and/or displayed. The scheme selection/deselection can be made either before or after the harmonizing colors are displayed. If the scheme selection/deselection is made before display, then only the selected scheme(s) are displayed. If the scheme selection/deselection is made after display, then the unselected and/or deselected schemes are removed from the display.

The user selects the desired harmonizing colors from the eight color harmonization schemes identified above and displayed on the monitor—or from such fewer schemes as are selected by the user.

Figure 5:
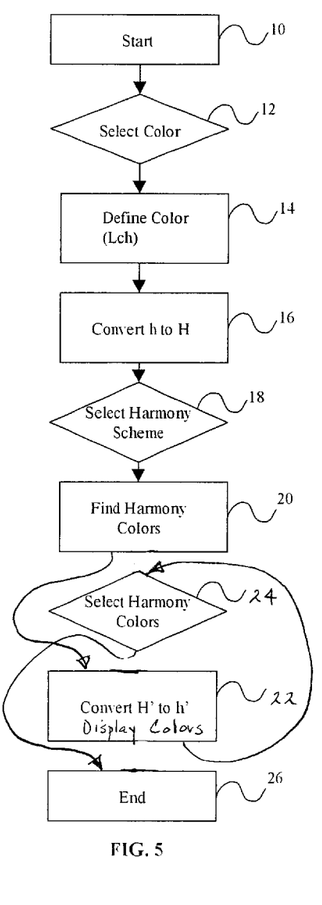
FIG. 5 is a flow chart illustrating the overall color harmonization process.

The basic steps of the color harmonization system are displayed in FIG. 5. After the start step 10, the user selects a reference color, step 12. The selected color is defined in the Lch color space, step 14. The h value for the reference color is then converted to an H value, step 16. The color harmonization scheme is then applied to the reference color and a list of harmony colors is generated, step 20. The H values of the harmonizing colors are converted to h values and displayed, step 22. The user next selects the desired harmony colors from the suggested harmony colors, step 24. The color harmonization portion of the system then ends, step 26.

Subsequent steps may include the printing of information corresponding to the reference color and the harmonizing colors. Such information might include—for each color—a color name, an identification of a physical manufacturer's color strip containing the color, a color code, color formulation information, and/or a rendition of the color itself. Alternatively, the system can output formulation information directly to a formulation/mixing system.

Figure 6:
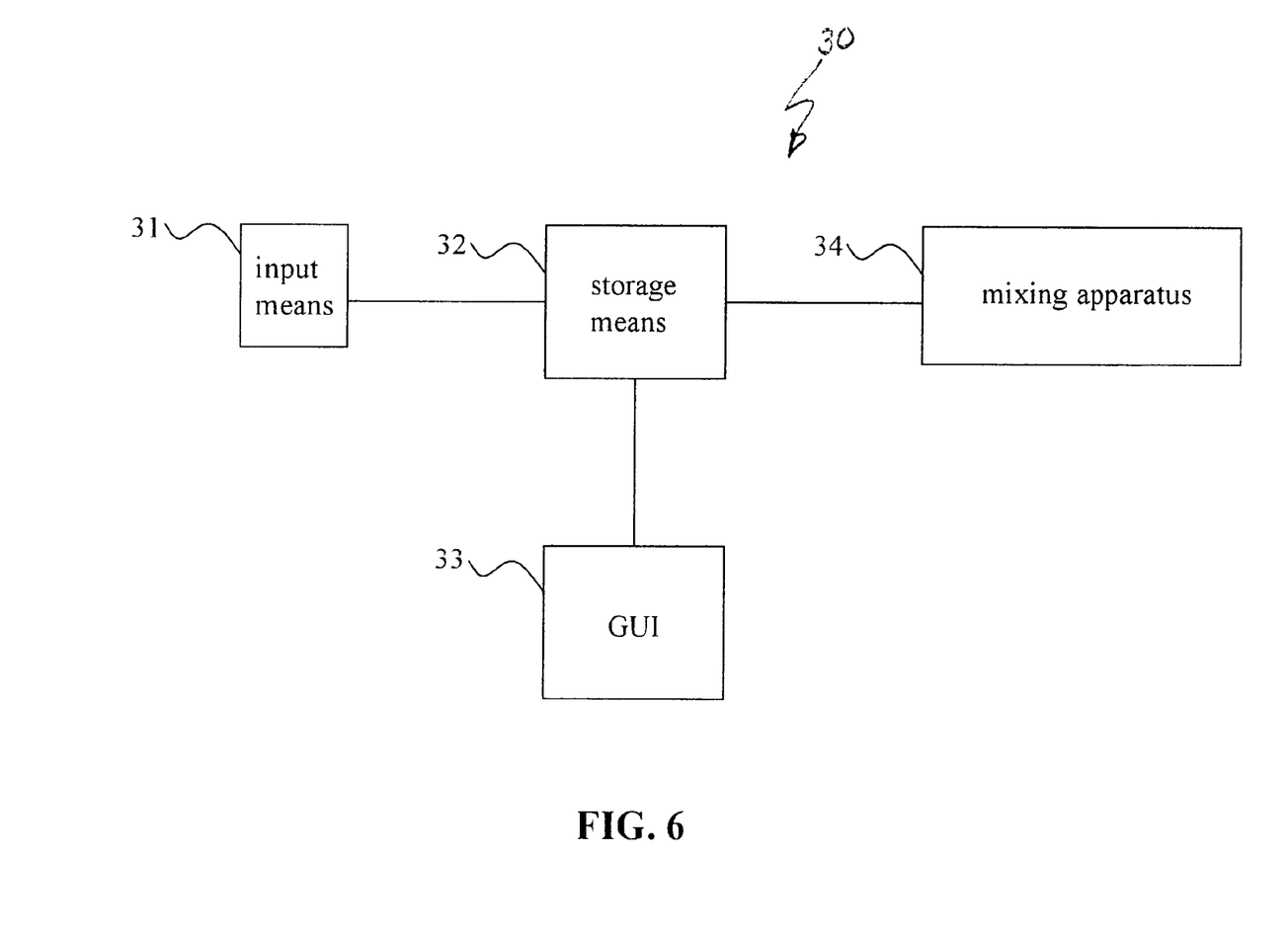
FIG. 6 is a block diagram of the components of the color harmonization system.

For purposes of the present disclosure, the color harmonization method is used in conjunction with a paint-matching and/or paint-mixing system 30 (FIG. 6). An input device 31, such as a spectrophotometer, can be used to measure a custom color from a paint chip, fabric sample, or other decorating material. This allows the user to custom design the color harmonization scheme to fit their specific needs. For example, if a user wishes to match the color scheme in the room to a particular piece of furniture, a fabric sample from the piece of furniture can be used to input a custom color. This technique is common in the paint-matching field.

A device 32, such as a computer, is used to calculate harmonizing colors for a given reference color as discussed above. The storage means 32 is connected to a Graphical User Interface (GUI) 33. The GUI 33 allows the user to select whether a custom color will be used, or a color will be selected from an array of colors stored in the storage means 32. The GUI 33 further allows the user to select or deselect one or more color harmonization schemes and to select harmonizing colors. Typically, the user will select either one or two harmonizing colors, which may be used for example as a trim color and/or an accent color. Additionally, the GUI 33 provides the user with an opportunity to adjust the L, c and h values of the selected colors so that the user can experiment with altering or fine-tuning the computer recommendations. All choices made by the user through the GUI 33 can be stored in a customer database within the device 32, again as is customary in the art.

After choosing harmonizing colors, a user may additionally have the colors applied to a rendition of a room interior or a house exterior. The GUI 33 preferably allows the user to choose whether to apply the colors to the interior or exterior of a house. If the user chooses to apply the colors to the interior of a building, a room will be displayed by the GUI 33 with the body, trim and accent colors used to paint the room according to typical decorating principles. If the user chooses to apply the colors to the exterior of a building, a house will be displayed by the GUI 33 with the colors applied to the exterior according to typical decorating principles.

Figure 7:
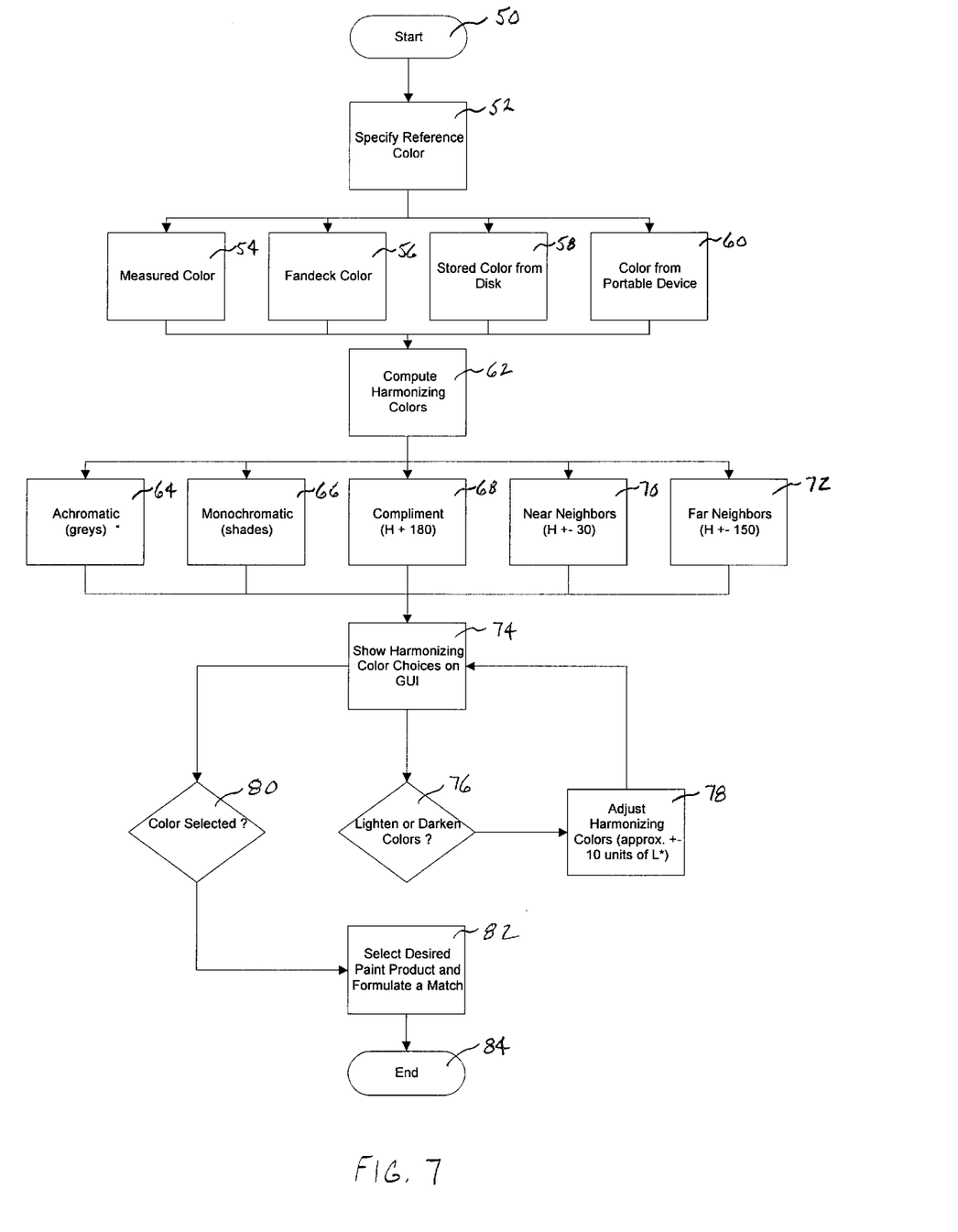
FIG. 7 is a flow chart illustrating in greater detail the color harmonization process.

FIG. 7 shows the harmonizing color method as implemented on the system illustrated in FIG. 6. After the start step, step 50, the user inputs a reference color, step 52. The user is given several choices for methods to input a reference color. Specifically, the methods include measuring a color (e.g. using a spectrophotometer integral with the system), step 54; selecting a color from a fandeck, step 56; retrieving a stored customer color, step 58; or inputting a color from a user device (e.g. a personal digital assistant—PDA—such as a Palm device), step 60.

Although not illustrated in FIG. 7, and as discussed above, the user can select and/or deselect one or more color harmonization schemes from a list of color harmonization schemes. The reference color is converted from Lch coordinates to coordinates on the artists color wheel. The harmonizing colors for the reference color are determined on the artists color wheel using the methods previously discussed, step 62. The following schemes, if selected or not deselected, are determined: achromatic, step 64; monochromatic, step 66; complement, step 68; near neighbors, step 70; and/or far neighbors, step 72. The harmonizing colors from all the calculated color schemes are converted from coordinates on the artists color wheel to Lch coordinates. As an optional step, each harmonizing color is color matched into a color library based on its Lch coordinates. The harmonizing colors (whether matched or unmatched to library colors) are then displayed on the GUI, step 74. The display of each color (see FIGS. 8 and 9) includes one or more of a rendition of the color, the color harmonization scheme, the manufacturer's name of the color, and the manufacturer's color strip on which the color can be found.

The user is then given the option, step 72, to lighten or darken (i.e. to adjust the hue and chroma) of any of the displayed colors to experiment with better satisfying the user, step 78. When the user is satisfied with the colors chosen, step 80, the user selects the displayed colors, step 82. The selected colors are stored in the system in conjunction with the user's record. If the colors have been matched into color libraries, the information regarding the selected colors is printed out for the user and/or for the store personnel. If the colors have not been matched into color libraries, paint formulation information is printed out and/or sent directly to a standard paint formulation/mixing machine.

The disclosed system and method are but illustrative of an unlimited variety of types and configurations of methods which may be made according to the principles of the invention. For example, the invention has been described in conjunction with architectural paint matching and harmonization systems. However, the invention is applicable to any situation in which harmonizing colors are desired, such as non-architectural paints and finishes and printing inks.

The above description is that of preferred embodiments of the invention. Various alterations and changes can be made without departing from the spirit and broader aspects of the invention as set forth in the appended claims which are to be interpreted in accordance with the principles of patent law including the doctrine of equivalents.

What is claimed is:

1. A method of calculating a harmonizing color comprising:
    defining a reference color in a first color space;
    converting the reference color from the first color space to a second color space, the second color space having a closer correspondence to the non-linear hue acuity of the human eye than the first color space, said first converting step including a nonlinear conversion;
    calculating a harmonizing color within said second color space based on the reference color; and
    converting the harmonizing color from the second color space to the first color space, said second converting step including a nonlinear conversion.

2. A method as defined in claim 1 wherein the second color space is the artists color wheel.

3. A method as defined in claim 1 wherein said calculating step comprises calculating a plurality of harmonizing colors.

4. A method of calculating a harmonizing color comprising:
    defining a reference color in a first color space having first hue angles;
    converting the reference color from the first color space to a second color space having second hue angles, the second hue angles being a nonlinear function of the first hue angles;
    calculating a harmonizing color in the second color space as a function of the second hue angle of the reference color; and
    converting the harmonizing color from the second color space to the first color space.

5. A method as defined in claim 4 wherein the second color space is an artists color wheel.

6. A method as defined in claim 4 wherein said calculating step comprises calculating a plurality of harmonizing colors.

7. A method of calculating a harmonizing color based upon a reference color, the harmonizing color having a harmonizing chroma and the reference color having a reference chroma and a reference hue, comprising:
    defining a brown region within a color space, said brown region having a hue range with hue boundaries and a chroma range with chroma boundaries;
    if the reference color is within the brown region, calculating the harmonizing chroma outside of the chroma range; and
    if the reference hue is within the hue range and the reference chroma is outside of the chroma range, calculating the harmonizing chroma within the chroma range.

8. A method as defined in claim 7 wherein:
    the red hue is 0 degrees;
    the hue boundaries are approximately 30 degrees and approximately 120 degrees; and
    the chroma boundaries are approximately 4 and 40.

9. A method of calculating harmonizing colors comprising:
    defining a brown region within a color space, the brown region being bounded by brown hue angles and brown chroma values;
    identifying a reference color within the color space;
    calculating a first harmonizing color within the color space as a function of the reference color;
    for each first harmonizing color that is within the brown region, calculating a second harmonizing color having the same hue as the first harmonizing color and having a chroma value outside the brown region; and
    for each first harmonizing color that is within the brown hue angles but outside the brown chroma values, calculating a second harmonizing color having the same hue as the first harmonizing color and having a chroma value inside the brown region.

10. A method as defined in claim 9 wherein:
    the red hue is 0 degrees;
    the brown angle boundaries are approximately 30 degrees and approximately 120 degrees; and
    the chroma value boundaries are approximately 4 and 40.

11. A method for obtaining harmonizing colors comprising the steps of:
    defining a reference color in a uniform color space according to hue, chroma and lightness values;

converting the hue value in the uniform color space to a hue value in a non-uniform color space having a closer correspondence to the nonlinear hue acuity of the human eye;

generating a harmonizing color for the reference color according to a typical color harmonization scheme and defining the harmonizing color in the second color space according to hue, chroma and lightness; and converting the hue angle of the harmonizing color in the second color space to a hue angle in the uniform color space.

12. A method as defined in claim 11 further including the steps of:

defining a brown range in the second color space with a hue range of $H_1$ to $H_2$ and a chroma range of $c_1$ to $c_2$;

generating a secondary harmonizing color at the same hue as the reference color or the harmonizing color within the chroma range if the reference color or the harmonizing color is within the hue range and outside the chroma range; and generating a secondary harmonizing color at the same hue as the reference color or the harmonizing color outside the chroma range if the reference color or the harmonizing color is within the hue range and within the chroma range.

13. A method of operating a machine to produce harmonizing paint colors comprising the steps of:

receiving a user selection of a reference color;

defining the reference color in a uniform color space;

receiving a user selection of a color harmonization scheme;

converting the reference color in the uniform color space to a non-uniform color space having a closer correspondence to the nonlinear hue acuity of the human eye;

generating one or more harmonizing colors for the reference color within the non-uniform color space according to the color harmonization scheme selected;

converting the harmonizing colors from the non-uniform space to the uniform color space; and displaying the reference color and the harmonizing colors.

14. A method as defined in claim 13 further including the steps of:

defining a brown range in the non-uniform color space with a hue range of $H_1$ to $H_2$ and a chroma range of $c_1$ to $c_2$;

generating a secondary harmonizing color at the same hue as the reference color or the harmonizing color within the chroma range if the reference color or the harmonizing color is within the hue range and outside the chroma range; and generating a secondary harmonizing color at the same hue as the reference color or the harmonizing color outside the chroma range if the reference color or the harmonizing color is within the hue range and within the chroma range.

15. A method as defined in claim 13 further including:

computing paint formulas for the harmonizing colors; and displaying the paint formulas for the harmonizing colors.

16. A method as defined in claim 11 wherein the non-uniform color space is the artists color wheel.

17. A method as defined in claim 13 wherein the second color space is the artists color wheel.

* * * * *